US007663656B2

(12) United States Patent
Yamazaki

(10) Patent No.: US 7,663,656 B2
(45) Date of Patent: Feb. 16, 2010

(54) OPTICAL SCANNING DEVICE AND IMAGE FORMING APPARATUS INCLUDING SAME

(75) Inventor: Kozo Yamazaki, Takarazuka (JP)

(73) Assignee: Ricoh Company Limited, Tokyo (JP)

( * ) Notice: Subject to any disclaimer, the term of this patent is extended or adjusted under 35 U.S.C. 154(b) by 0 days.

(21) Appl. No.: 12/209,374

(22) Filed: Sep. 12, 2008

(65) Prior Publication Data

US 2009/0074462 A1 Mar. 19, 2009

(30) Foreign Application Priority Data

Sep. 14, 2007 (JP) ............................ 2007-239714

(51) Int. Cl.
*G02B 26/10* (2006.01)
*B41J 2/435* (2006.01)

(52) U.S. Cl. ...................... 347/242; 347/245; 347/257; 347/263

(58) Field of Classification Search ................. 347/242, 347/245, 257, 263
See application file for complete search history.

(56) References Cited

U.S. PATENT DOCUMENTS 4,853,710 A 8/1989 Shimada et al.
6,137,614 A * 10/2000 Endoh ..................... 359/196.1
6,151,057 A 11/2000 Yamazaki et al.
7,050,731 B2 5/2006 Bannai et al.
7,203,444 B2 4/2007 Yamazaki
7,477,279 B2 * 1/2009 Ohnishi ...................... 347/263

FOREIGN PATENT DOCUMENTS

JP 2002-341467 11/2002
JP 2006-323066 11/2006

* cited by examiner

*Primary Examiner*—Huan H Tran
(74) *Attorney, Agent, or Firm*—Oblon, Spivak, McClelland, Maier & Neustadt, L.L.P.

(57) ABSTRACT

An optical scanning device including a first housing including a rotating deflector configured to deflect a light beam from at least one light source to scan a surface to be scanned with a deflected light beam, a second housing including one or more reflecting mirrors, and three supporting members configured to support the second housing relative to an image forming apparatus. The first housing is mounted inside the second housing, and mounts to fix the first housing to the second housing are positioned substantially on or within sides of a triangle formed by the three supporting members.

20 Claims, 11 Drawing Sheets

OPTICAL SCANNING DEVICE AND IMAGE FORMING APPARATUS INCLUDING SAME

CROSS-REFERENCE TO RELATED APPLICATIONS

The present patent application is based on and claims priority pursuant to 35 U.S.C. §119 from Japanese Patent Application No. 2007-239714, filed on Sep. 14, 2007 in the Japan Patent Office, the entire contents of which are incorporated herein by reference.

BACKGROUND OF THE INVENTION

1. Field of the Invention

Exemplary aspects of the present invention generally relate to an optical scanning device employed in a writing system in an image forming apparatus such as a digital copier and a laser printer, and an image forming apparatus including the optical scanning device.

2. Description of the Background

Related-art image forming apparatuses, such as a copier, a facsimile machine, a printer, or a multifunction printer having two or more of copying, printing, scanning, and facsimile functions, form a toner image on a recording medium (e.g., a sheet) according to image data using an electrophotographic method. In such a method, for example, a charger charges a surface of an image bearing member (e.g., a photoconductor); an optical scanning device emits a light beam onto the charged surface of the photoconductor to form an electrostatic latent image on the photoconductor according to the image data; the electrostatic latent image is developed with a developer (e.g., a toner) to form a toner image on the photoconductor; a transfer device transfers the toner image formed on the photoconductor onto a sheet; and a fixing device applies heat and pressure to the sheet bearing the toner image to fix the toner image onto the sheet. The sheet bearing the fixed toner image is then discharged from the image forming apparatus.

As described above, the image forming apparatus such as a laser printer, a digital copier, or a laser facsimile machine includes the optical scanning device to form the electrostatic latent image on the surface of the photoconductor. One example of the optical scanning device is configured to deflect a light beam emitted from a light source using a rotating deflector to scan the surface of the photoconductor with the deflected light beam.

To meet demand for high-quality images and high-speed image formation, a tandem-type image forming apparatus using multiple photoconductors is widely used as a full-color image forming apparatus in recent years. In the tandem-type image forming apparatus, higher accuracy in superposition of images respectively formed on the multiple photoconductors is required to achieve the high-quality images.

However, the above-described optical scanning device using the rotating deflector is susceptible to vibration due to high-speed rotation of a polygon mirror, possibly resulting in image deterioration such as color shift and uneven image density.

To prevent such image deterioration caused by the vibration from the optical scanning device, various methods and techniques have been proposed.

Published unexamined Japanese Patent Application No. (hereinafter referred to as JP-A-) 2006-323066 discloses an image forming system in which a vibration damping means is included in an optical scanning device to suppress vibration.

In another approach, JP-A-2002-341467 discloses an optical scanning device configured to suppress generation of vibration using a compact and lightweight configuration.

However, the image forming system disclosed in JP-A-2006-323066 requires higher cost to include the vibration unit and multiple detectors. Further, although a method for suppressing transmission of the vibration by improving rigidity of the optical scanning device is disclosed in JP-A-2002-341467, the range of available layouts of the optical scanning device is more limited because the optical scanning device needs to be fixed to a main frame of an image forming apparatus.

In the tandem-type image forming apparatus, in general, multiple optical scanning devices are included to perform exposure on multiple photoconductors. Alternatively, a single optical scanning device may be used to perform exposure on multiple photoconductors. When the single optical scanning device is used to emit four light beams onto surfaces of four photoconductors, for example, four optical paths are formed using multiple reflecting mirrors provided in the optical scanning device. A wide variety of arrangements of the reflecting mirrors is available depending on the layout of components in the image forming apparatus. To achieve such a wide variety of arrangements, one example of the optical scanning device includes a first optical housing and a second optical housing, with a rotating deflector, and an optical element such as a lens when needed, included in the first of these two optical housings while the multiple reflecting mirrors are included in the second optical housing.

However, as described above, in the optical scanning device using the rotating deflector, the polygon mirror is rotated at high speed and vibration is transmitted from the optical housing including the rotating deflector to the other optical housing. Consequently, portions of the other optical housing cantilevered to the image forming apparatus are heavily susceptible to vibration, resulting in image deterioration.

SUMMARY

In view of the foregoing, exemplary embodiments of the present invention provide an optical scanning device including multiple optical housings configured to suppress transmission of vibration from one optical housing including a rotating deflector to another optical housing so as to prevent image deterioration and provide high-quality images, and an image forming apparatus including the optical scanning device.

In one exemplary embodiment, an optical scanning device includes a first housing including a rotating deflector configured to deflect a light beam from at least one light source to scan a surface to be scanned with a deflected light beam; a second housing including one or more reflecting mirrors; and three supporting members configured to support the second housing relative to an image forming apparatus. The first housing is mounted inside the second housing, and mounts to fix the first housing to the second housing are positioned substantially on or within sides of a triangle formed by the three supporting members.

Another exemplary embodiment provides an image forming apparatus including a latent image bearing member configured to bear an electrostatic latent image; a charging device configured to charge a surface of the latent image bearing member; an irradiating device configured to scan and irradiate a charged surface of the latent image bearing member with a light beam according to image data to form an electrostatic latent image thereon; a developing device configured to develop the electrostatic latent image with toner into a visible toner image; a transfer device configured to transfer the toner image onto a recording medium; and a fixing device configured to fix the toner image on the recording medium. The irradiating device includes the optical scanning device described above.

Additional features and advantages of the present invention will be more fully apparent from the following detailed description of exemplary embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein.

DETAILED DESCRIPTION OF EXEMPLARY EMBODIMENTS

Figure 1:
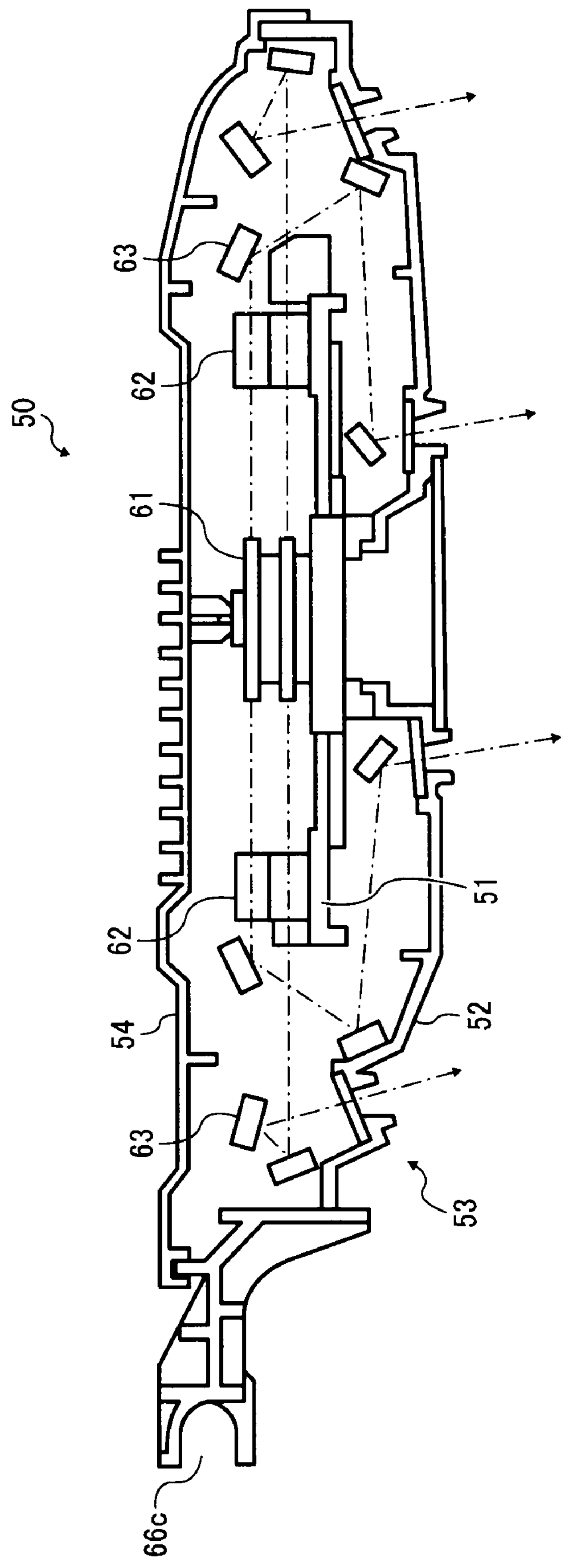
FIG. 1 is a vertical cross-sectional view illustrating an example of a configuration of an optical scanning device according to exemplary embodiments.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Exemplary embodiments of the present invention are now described below with reference to the accompanying drawings.

In a later-described comparative example, exemplary embodiment, and exemplary variation, for the sake of simplicity the same reference numerals will be given to identical constituent elements such as parts and materials having the same functions, and redundant descriptions thereof omitted unless otherwise stated.

Typically, but not necessarily, paper is the medium from which is made a sheet on which an image is to be formed. It should be noted, however, that other printable media are available in sheets, and accordingly their use here is included. Thus, solely for simplicity, although this Detailed Description section refers to paper, sheets thereof, paper feeder, etc., it should be understood that the sheets, etc., are not limited only to paper but includes other printable media as well.

Figure 2:
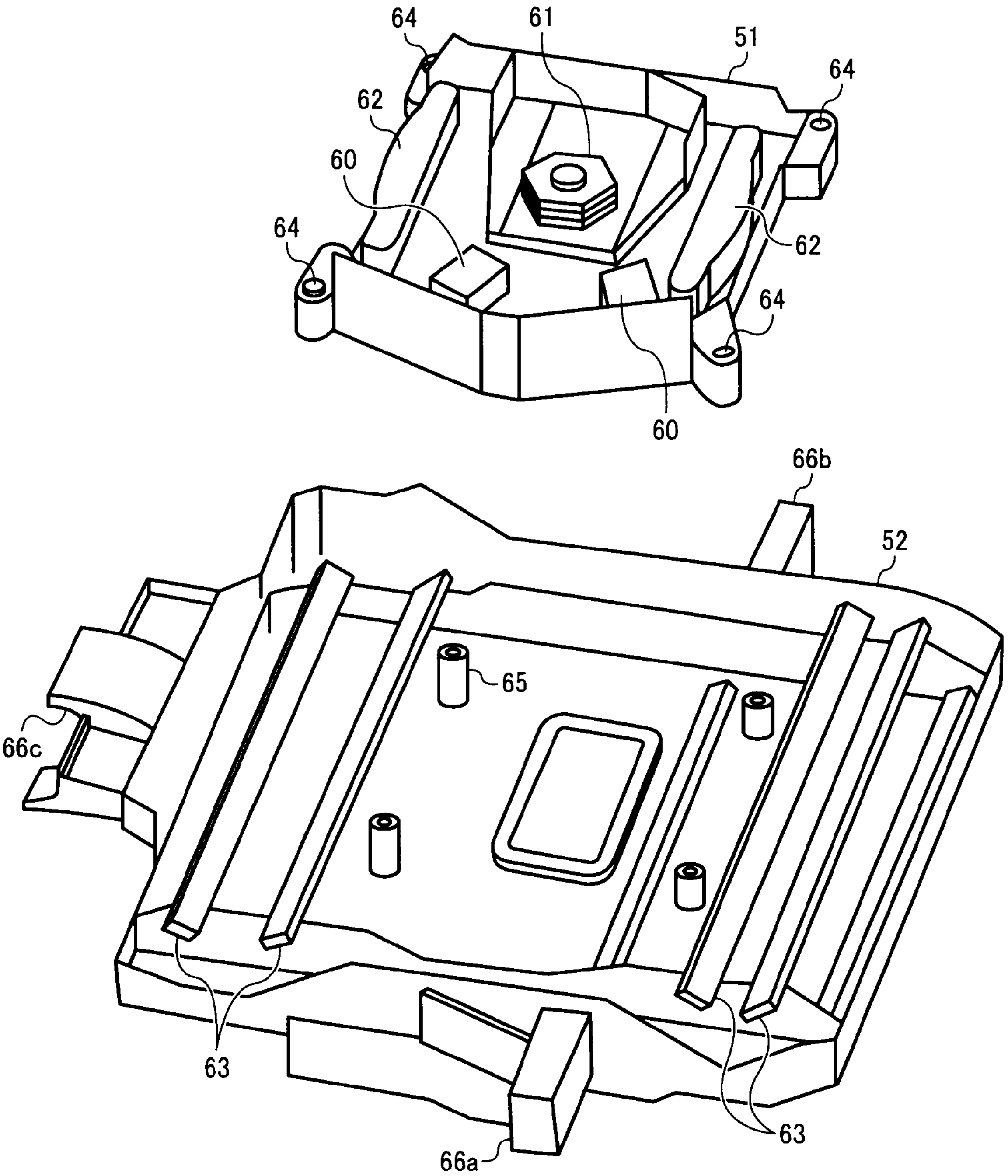
FIG. 2 is a perspective view illustrating configurations of a first housing and a second housing included in the optical scanning device.

FIG. 1 is a vertical cross-sectional view illustrating an example of a configuration of an optical scanning device according to exemplary embodiments. FIG. 2 is an exploded perspective view illustrating configurations of a first housing and a second housing included in the optical scanning device.

Referring to FIGS. 1 and 2, it can be seen that an optical scanning device 50 includes an optical housing assembly 53 including a first housing 51 and a second housing 52. The optical housing assembly 53 is covered with a cover member 54 to form a substantially enclosed space in the optical housing assembly 53.

The first housing 51 includes light sources 60 and a polygon scanner 61 serving as a rotating deflector. According to exemplary embodiments, the first housing 51 further includes fθ lenses 62. The optical scanning device 50 may be employed in a full-color image forming apparatus using four colors. Specifically, each of the two light sources 60 shown in FIG. 2 includes a multi-beam light source unit in which two semiconductor lasers each serving as a light source are arranged one above the other so that four light beams in total are used for scanning. In order to handle the two light beams emitted from each of the light sources 60, the polygon scanner 61 includes two polygon mirrors superimposed on each other, and each of the fθ lenses 62 also has a two-tiered structure.

The second housing 52 includes multiple reflecting mirrors 63 for reflecting the light beams passing through the fθ lenses 62 to change optical paths of the light beams. Reference numeral 63 is assigned only to some of the reflecting mirrors shown in FIGS. 1 and 2 for the purpose of simplifying the drawings. The second housing 52 further includes a dustproof glass member, not shown, provided at a portion at which the light beam serving as scanning light is directed from the inside of the optical housing assembly 53 to the outside thereof.

The optical scanning device 50 according to exemplary embodiments is configured to direct each of the light beams downward. Alternatively, however, each of the light beams may be directed upward or sideward. Further, the number of the light beams is not limited to four. For example, a single light beam may be used for scanning in a monochrome image forming apparatus, or two or three light beams may be used for scanning in a multicolor image forming apparatus.

The second housing 52 is slightly larger than the first housing 51 and the first housing 51 is mounted within the second housing 52. The optical scanning device 50 according to exemplary embodiments is provided with four mounts for fixing the first housing 51 to the second housing 52. Each of the mounts includes a mounting member 64 provided on the first housing 51 and a positioning member 65 provided on the second housing 52. The mounting member 64 provided on the first housing 51 is fitted into the positioning member 65 provided on the second housing 52. Thereafter, both the mounting member 64 and the positioning member 65 are fixed together with a screw so that the first housing 51 is firmly fixed to the second housing 52. Specifically, the mount including the mounting member 64 and the positioning member 65 functions as a positioning portion as well as a mount.

Figure 3:
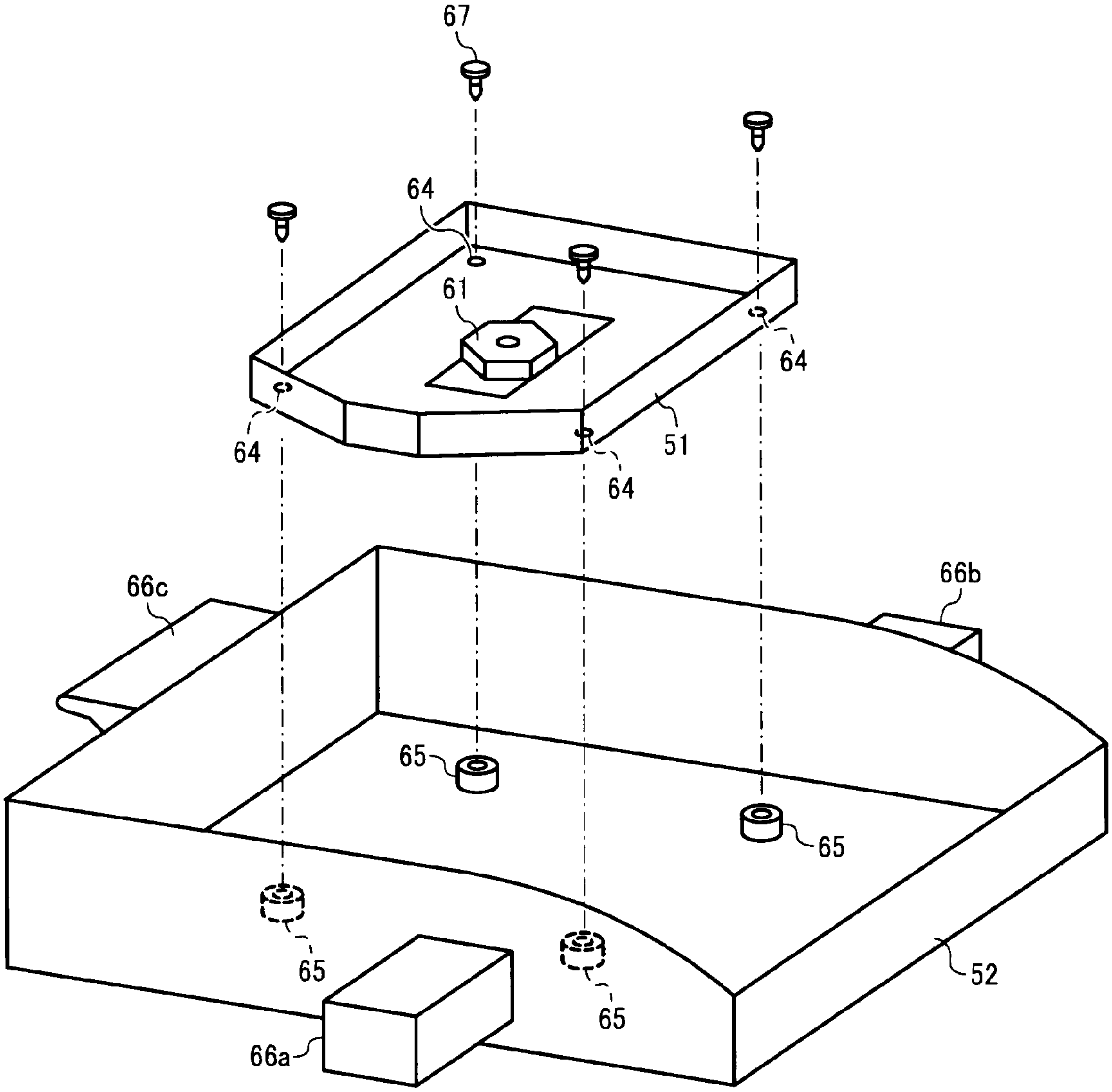
FIG. 3 is a schematic perspective view illustrating mounts provided on the first housing and the second housing, and supporting members provided on the second housing.

FIG. 3 is a schematic perspective view illustrating the mounts provided on the first housing 51 and the second housing 52, and supporting members provided on the second housing 52. As illustrated in FIG. 3, the number of the positioning members 65 provided on the second housing 52, which is four in exemplary embodiments, is the same as the number of the mounting members 64 provided on the first housing 51. Each of the mounting members 64 is fixed to each of the positioning members 65 with a screw 67.

Four or more mounts for fixing the first housing 51 to the second housing 52 are provided and arranged in a polygonal pattern. For example, when four mounts are provided, the mounts are arranged in a rectangular pattern, and when five mounts are provided, the mounts are arranged in a pentagonal pattern. In exemplary embodiments, the mounting members 64 included in the mounts are provided at outermost edges on the outline of the first housing 51 in a rectangular pattern.

The second housing 52 further includes three supporting members for attaching the optical scanning device 50 to the image forming apparatus. Supporting members 66*a* and 66*b* are provided at the front and back of the optical device 50 in a depth direction, that is, a longitudinal direction of the reflecting mirrors 63, which is also a main scanning direction. A supporting member 66*c* is provided on a side of the second housing 52 in a width direction perpendicular to the depth direction.

The mounts each including the mounting member 64 and the positioning member 65 are provided substantially on or within three sides of a triangle formed by the three supporting members 66*a* to 66*c* (hereinafter collectively referred to as supporting members 66). It is to be noted that, in exemplary embodiments, positions of the supporting members 66 and the mounts in a vertical direction are not limited to any particular arrangement, and intersections of vertical lines drawn from each of the supporting members 66 and the mounts with a horizontal surface are defined. Specifically, the triangle formed by the supporting members 66 means a triangle formed by the intersections of the vertical lines drawn from each of the supporting members 66 in a plane of projection. Accordingly, the vertical lines drawn from each of the mounts are positioned substantially on or within the three sides of the triangle thus formed on the plane of projection. In exemplary embodiments, each of the positions of the supporting members 66 and the mounts indicates a center thereof. For example, when each of the mounts is tighten with the screw 67 as in the case of exemplary embodiments, each of the positions of the supporting members 66 and the mounts is indicated by a center of a screw hole. Therefore, when the mounts are positioned substantially on or within the three sides of the triangle formed by the supporting members 66, it means that positions of vertical lines drawn from the center of each of the mounts, that is, the center of the screw hole in the case of exemplary embodiments, are positioned on or within the three sides of the triangle formed by the intersections of the vertical lines drawn from the supporting members 66 in the plane of projection.

FIGS. 4A to 4E are schematic views illustrating examples of relative positions of the mounts and the supporting members 66. In the following description, reference numeral 68 denotes the mount including the mounting member 64 and the supporting member 65.

FIGS. 4A to 4D illustrate exemplary embodiments of the relative positions of the mounts 68 and the supporting members 66. FIG. 4E illustrates a comparative example thereof.

Figure 4A:
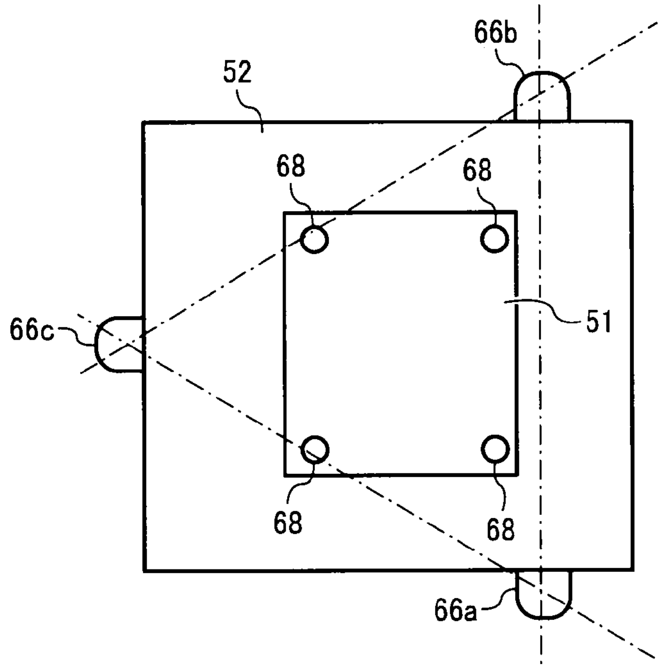
FIGS. 4A to 4E are schematic views illustrating examples of relative positions of the mounts and the supporting members.

Referring to FIG. 4A illustrating a first exemplary embodiment, the four mounts 68 are arranged on the first housing 51 in a square or a rectangular pattern, and the supporting members 66 are provided on outer surfaces of the second housing 52. As illustrated in FIG. 4A, each of the mounts 68 is positioned substantially on or within the triangle formed by the supporting members 66.

Figure 4B:
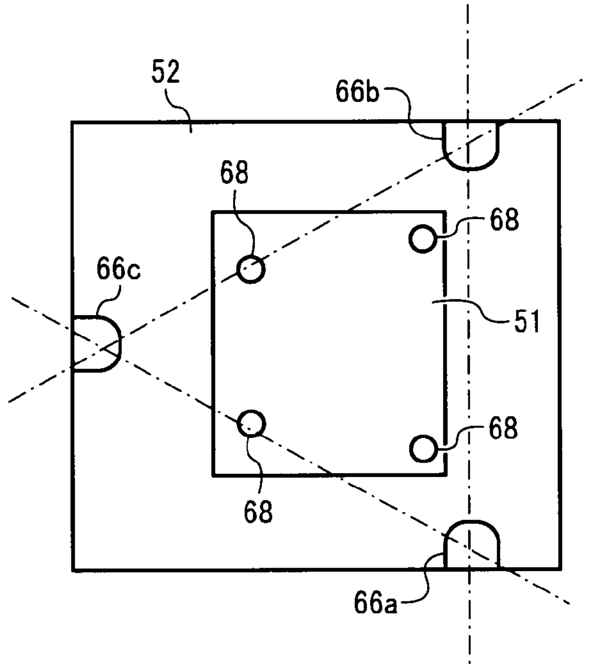

Referring to FIG. 4B illustrating a second exemplary embodiment, the four mounts 68 are arranged on the first housing 51 in a trapezoidal pattern, and the supporting members 66 are provided on inner surfaces of the second housing 52. In the second exemplary embodiment, each of the mounts 68 is positioned substantially on or within the triangle formed by the supporting members 66.

Referring to FIG. 4E illustrating a first comparative example, the supporting members 66*a* and 66*b* are provided on an outer surface of the second housing 52 in a width direction. As a result, an acute triangle is formed by connecting the supporting members 66, and the two mounts 68 arranged closer to the supporting member 66*c* are positioned outside the acute triangle. To solve such a problem, the two mounts 68 arranged closer to the supporting member 66*c* are arranged as illustrated in FIGS. 4C and 4D.

Figure 4C:
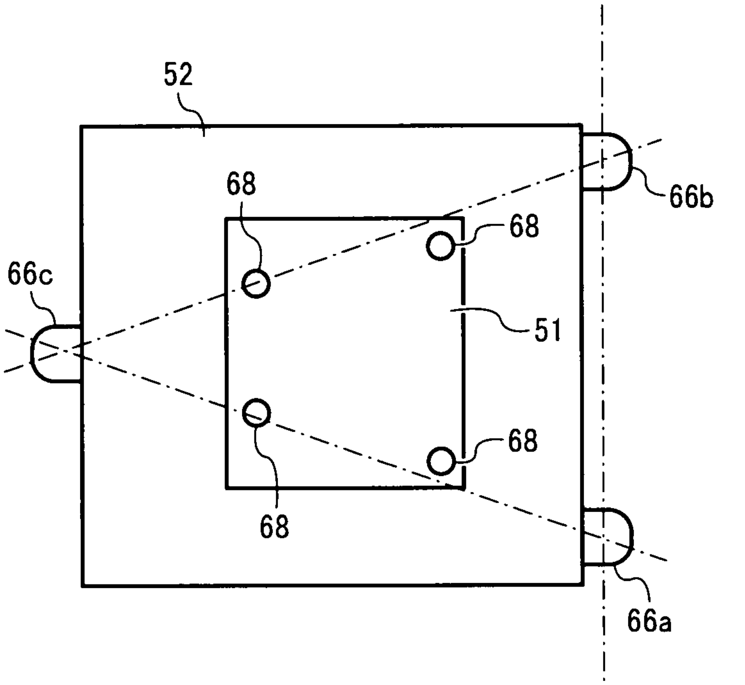

Referring to FIG. 4C illustrating a third exemplary embodiment, the four mounts 68 are arranged on the first housing 51. Because the triangle formed by the supporting members 66 has an acute angle, a distance between the two mounts 68 arranged closer to the supporting member 66*c* is reduced such that the two mounts 68 are positioned substantially on the triangle. The other two mounts 68 are positioned substantially on or within the triangle.

Figure 4D:
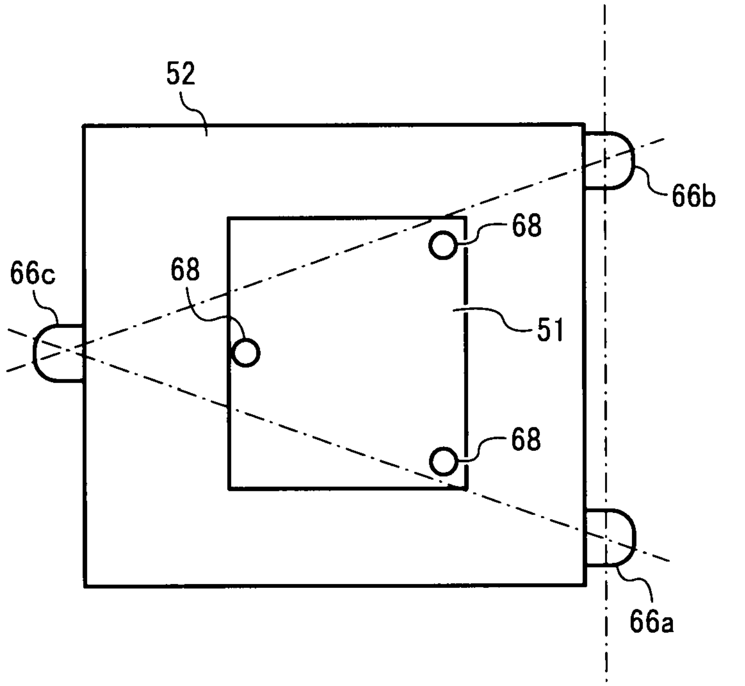
Figure 4E:
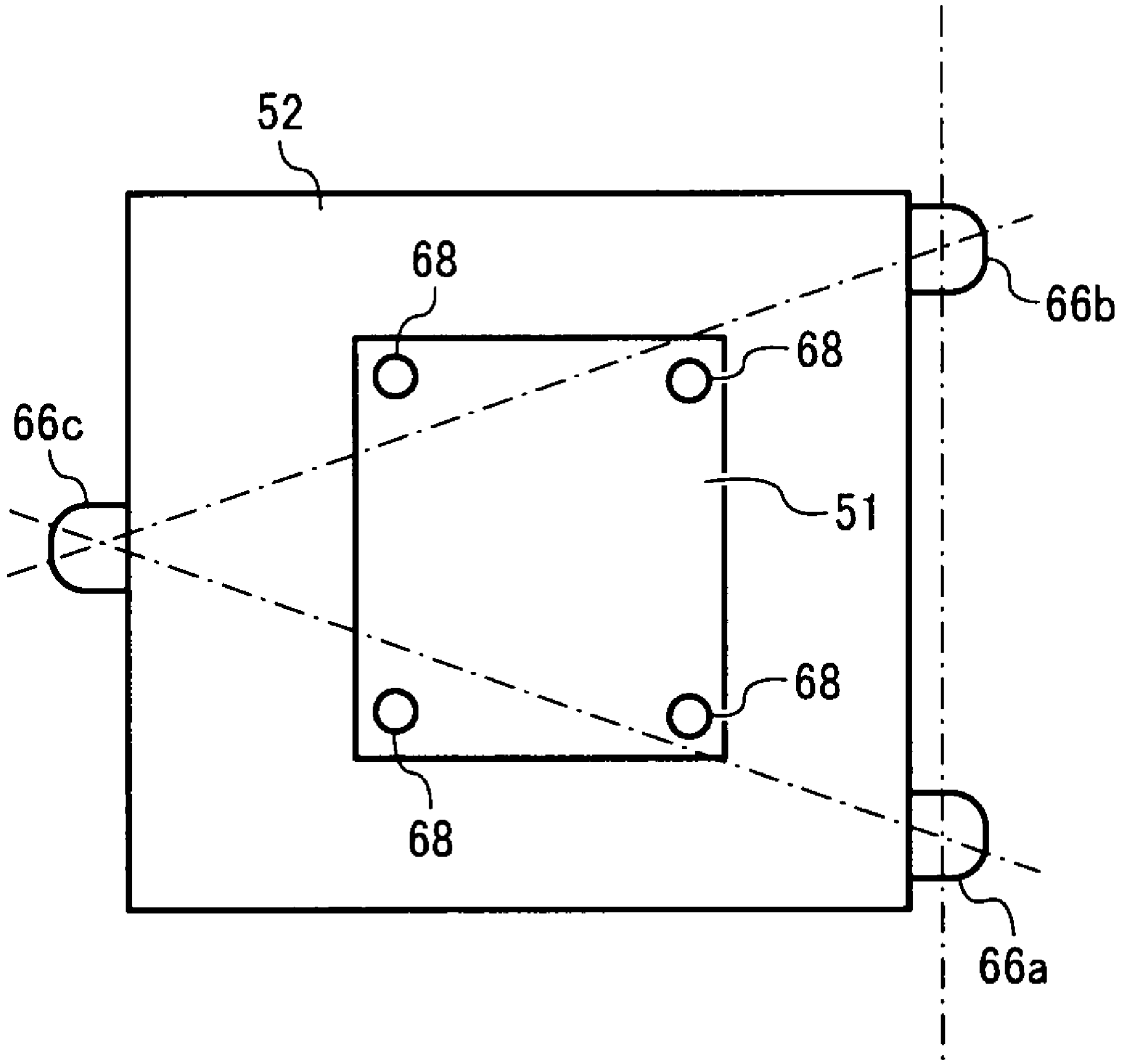

Referring to FIG. 4D illustrating a fourth exemplary embodiment, only one mount 68 is arranged closer to the supporting member 66*c* such that all of the three mounts 68 are positioned substantially on or within the acute triangle formed by the supporting members 66.

Figure 5A:
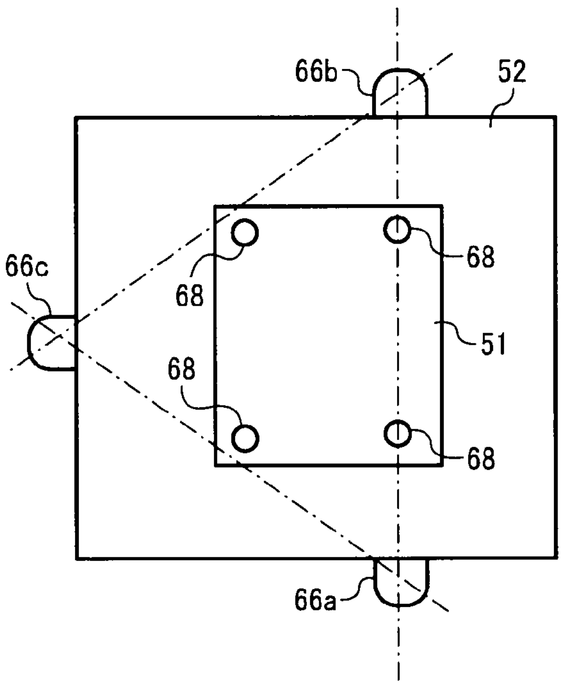
FIGS. 5A and 5B are schematic views illustrating other examples of the relative positions of the mounts and the supporting members.
Figure 5B:
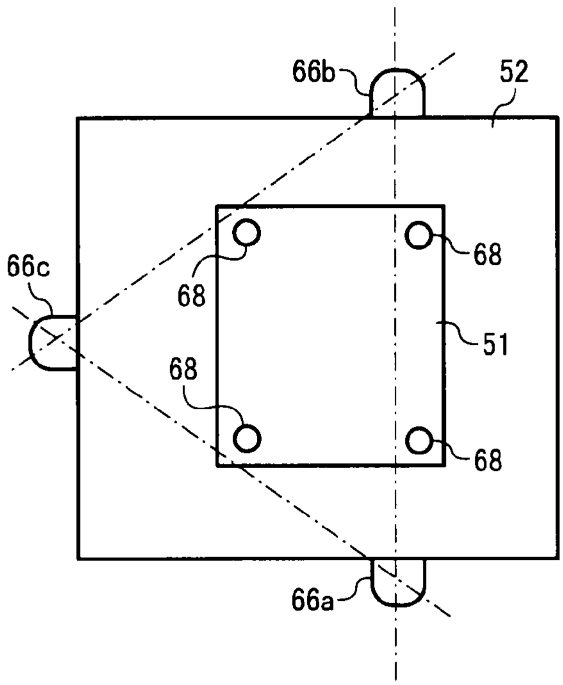

FIGS. 5A and 5B are schematic views illustrating examples of relative positions of the mounts 68 and the supporting members 66 when the triangle formed by the supporting members 66 is small in a width direction of the second housing 52.

Referring to FIG. 5B illustrating a second comparative example, the two mounts 68 arranged closer to the supporting members 66*a* and 66*b* are positioned outside of a side of the triangle between the supporting members 66*a* and 66*b* when the triangle formed by the supporting members 66 is small in a width direction of the second housing 52. To solve such a problem, the mounts 68 are arranged as illustrated in FIG. 5A.

Referring to FIG. 5A illustrating a fifth exemplary embodiment, the four mounts 68 are arranged on the first housing 51 in a rectangular pattern. The two mounts 68 arranged closer to the supporting members 66*a* and 66*b* are positioned slightly close to the supporting member 66*c* so as to be positioned substantially on the side of the triangle between the supporting members 66*a* and 66*b*. Alternatively, the two mounts 68 may be arranged so as to be positioned within the triangle.

Figure 6A:
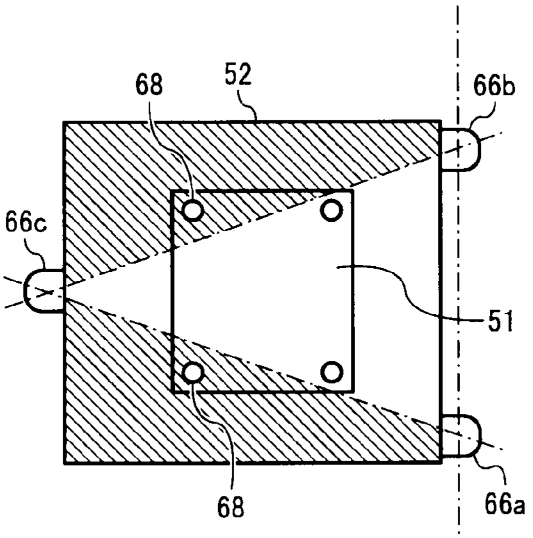
FIGS. 6A and 6B are schematic views illustrating cantilevered supporting members of the second housing.
Figure 6B:
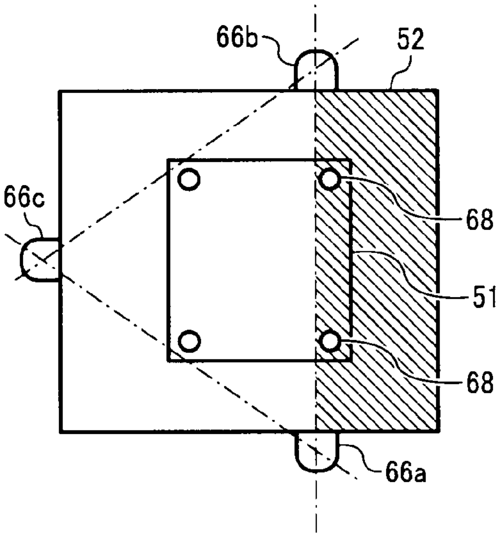

A description is now given of the first and second comparative examples respectively illustrated in FIG. 4E and FIG. 5B with reference to FIGS. 6A and 6B. FIG. 6A is a schematic view illustrating cantilevered portions in the configuration according to the first comparative example. FIG. 6B is a schematic view illustrating cantilevered portions in the configuration according to the second comparative example.

An inner portion of the triangle formed by the supporting members 66 provided on the second housing 52 is firmly supported by the three supporting members 66*a*, 66*b*, and 66*c*. Accordingly, when the mounts 68 are arranged within the triangle, the second housing 52 can tolerate the vibration mainly transmitted from the rotating deflector 61 through the mounts 68. However, as illustrated in FIGS. 6A and 6B, portions exterior to the triangle formed by the supporting members 66, that is, shaded portions in FIGS. 6A and 6B, are cantilevered. Specifically, the shaded portions illustrated in FIG. 6A are supported only by two sides of the triangle between the supporting members 66*a* and 66*c* and the supporting members 66*b* and 66*c*, and the shaded portion illustrated in FIG. 6B is supported only by one side of the triangle between the supporting members 66*a* and 66*b*. When the mounts 68 are positioned within the shaded portions which are cantilevered as described above, the shaded portions are vibrated heavily compared to the inner portion of the triangle due to the vibration transmitted through the mounts 68, possibly degrading image quality.

However, as described in the foregoing exemplary embodiments with reference to FIGS. 4A to 4D and 5A, the optical scanning device 50 according to exemplary embodiments prevents an increase in the vibration transmitted from the first housing 51 to the second housing 52 by arranging the mounts 68 substantially on or within the triangle formed by the supporting members 66. As a result, high-quality image can be obtained by preventing image deterioration.

Figure 7:
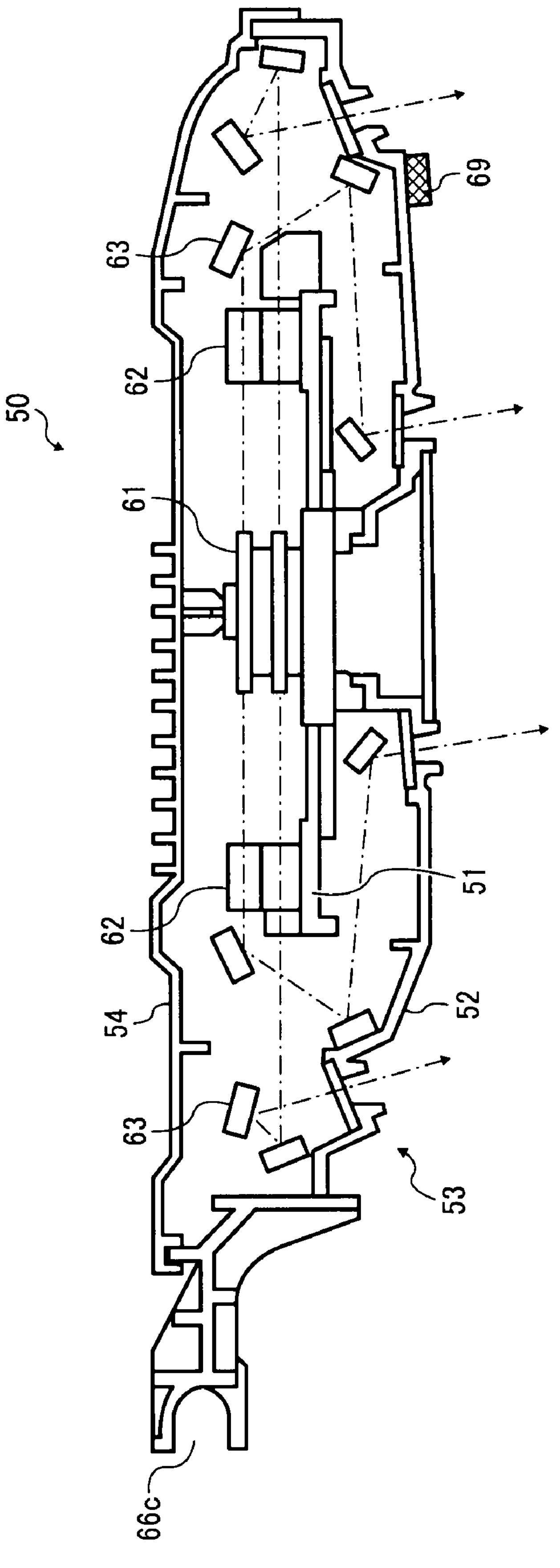
FIG. 7 is a vertical cross-sectional view illustrating the optical scanning device in which an elastic member or a viscoelastic member is adhered to a bottom surface of the second housing.

Further, as illustrated in FIG. 7, an elastic or viscoelastic member 69 may be provided between the optical scanning device 50 and the image forming apparatus, not shown, by attaching the elastic or viscoelastic member 69 to a bottom surface of the second housing 52. As a result, vibration transmitted from the image forming apparatus to the optical device 50 can be further suppressed.

The elastic or viscoelastic member 69 is preferably contacted against a member of the image forming apparatus placed immediately below the elastic or viscoelastic member 69. Accordingly, an increase in vibration in the portions exterior to the triangle formed by the supporting members 66 of the second housing 52 is prevented. When a main body of the image forming apparatus is placed immediately below the elastic or viscoelastic member 69, the elastic or viscoelastic member 69 is preferably contacted against the main body. Alternatively, when a developing device is placed immediately below the elastic or viscoelastic member 69, the elastic or viscoelastic member 69 may be contacted against the developing device. Vibration transmitted from the image forming apparatus to the optical device 50 can be suppressed by providing the elastic or viscoelastic member 69 therebetween, regardless of whether the optical scanning device 50 is fixed or not fixed to the image forming apparatus.

Figure 8A:
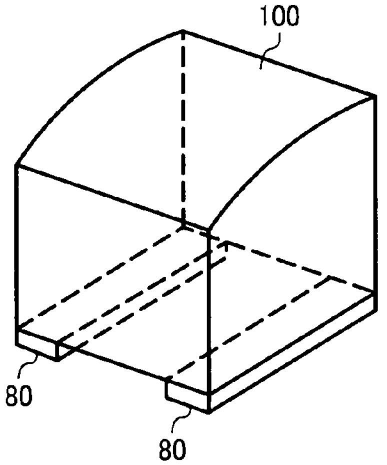
FIGS. 8A and 8B are perspective and cross-sectional views, respectively, of a viscoelastic member adhered to an installation surface of an image forming apparatus.
Figure 8B:
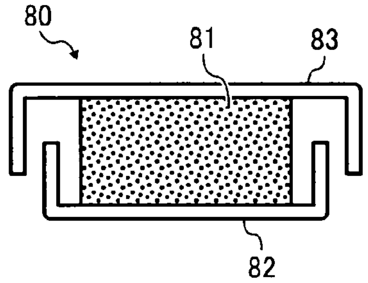

Vibration or impact may be transmitted to the image forming apparatus including the optical scanning device 50 through an installation surface of the image forming apparatus that necessarily contacts a supporting desk, a shelf, a floor, or the like. To prevent image deterioration due to such vibration and impact, it is preferable to provide a viscoelastic member 81 on the installation surface of the image forming apparatus. FIG. 8B is a cross-sectional view illustrating a structure of a vibration absorbing member 80, in which the viscoelastic member 81 is sandwiched between two structural materials 82 and 83. The vibration absorbing member 80 having the above-described structure is provided on the installation surface of an image forming apparatus 100 as illustrated in FIG. 8A, which is a perspective view illustrating an example in which the two generally rectangular vibration absorbing members 80 are provided on the installation surface of the image forming apparatus 100. The vibration absorbing member 80 may be sized and shaped as required. For example, the four vibration absorbing members 80 may be provided at four corners on the bottom of the image forming apparatus 100, respectively. As a result, transmission of vibration and impact from outside of the image forming apparatus 100 to the optical scanning device 50 can be prevented by providing the vibration absorbing member 80 including the viscoelastic member 81 on the installation surface of the image forming apparatus 100. Additionally, a rubber foot often provided on a bottom surface of the image forming apparatus is preferably provided under the vibration absorbing member 80.

Figure 9:
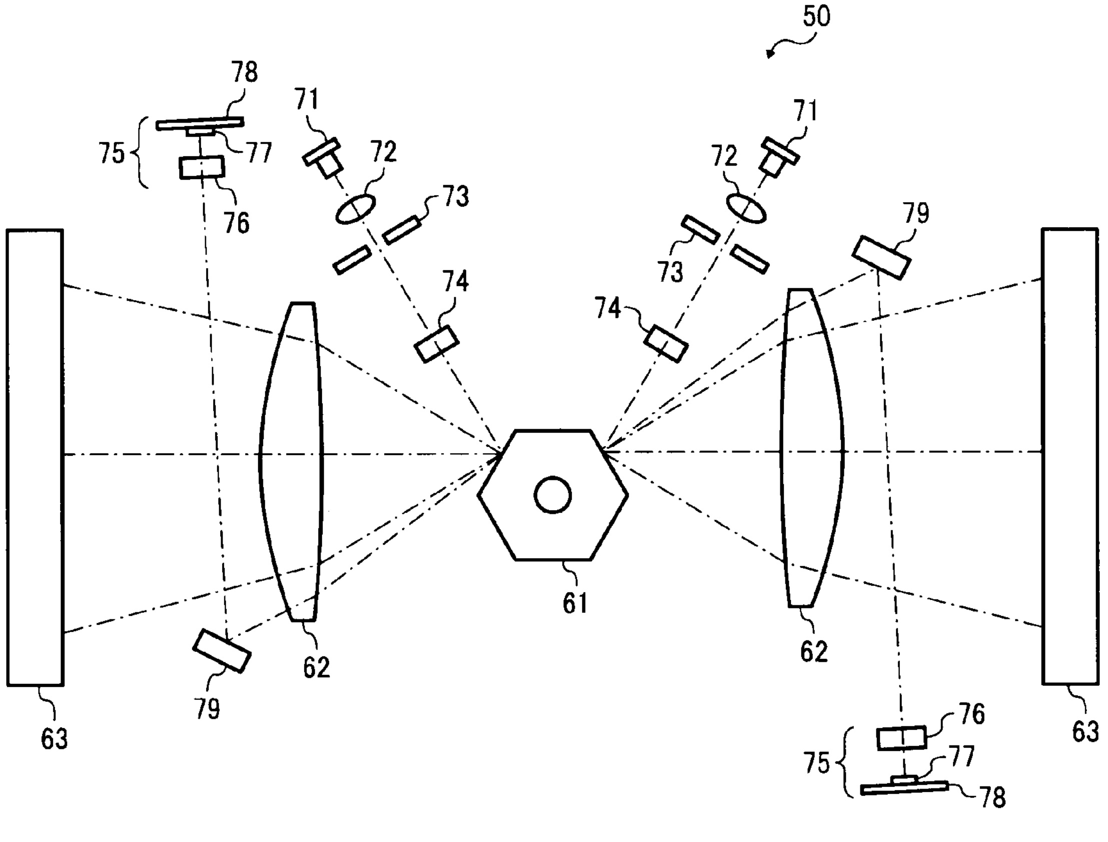
FIG. 9 is a schematic plan view illustrating an arrangement of optical elements in the optical scanning device.

FIG. 9 is a schematic plan view illustrating an arrangement of optical elements in the optical scanning device 50.

Referring to FIG. 9, the optical scanning device 50 includes the polygon scanner 61 serving as a common rotating deflector. A set of optical elements is provided on each side of the polygon scanner 61 in a substantially symmetrical manner in order to scan images of four colors. Reference numeral 71 denotes a semiconductor laser serving as a light source and corresponds to the light source 60 illustrated in FIG. 2. Reference numeral 72 denotes a collimating lens; reference numeral 73 denotes an aperture; reference numeral 74 denotes a cylindrical lens; and reference numeral 75 denotes a synchronization detector including an imaging lens 76, a photodiode 77, and a substrate 78. Reference numeral 79 denotes a reflecting mirror for guiding the light beam to the synchronization detector 75. The reflecting mirror 79 guides the light beam to the synchronization detector 75 placed outside of a writing area in a main scanning direction during scanning to control a timing of writing. The synchronization detector 75 is provided on the second housing 52.

A description is now given of the image forming apparatus 100 including the optical scanning device 50 according to exemplary embodiments.

Figure 10:
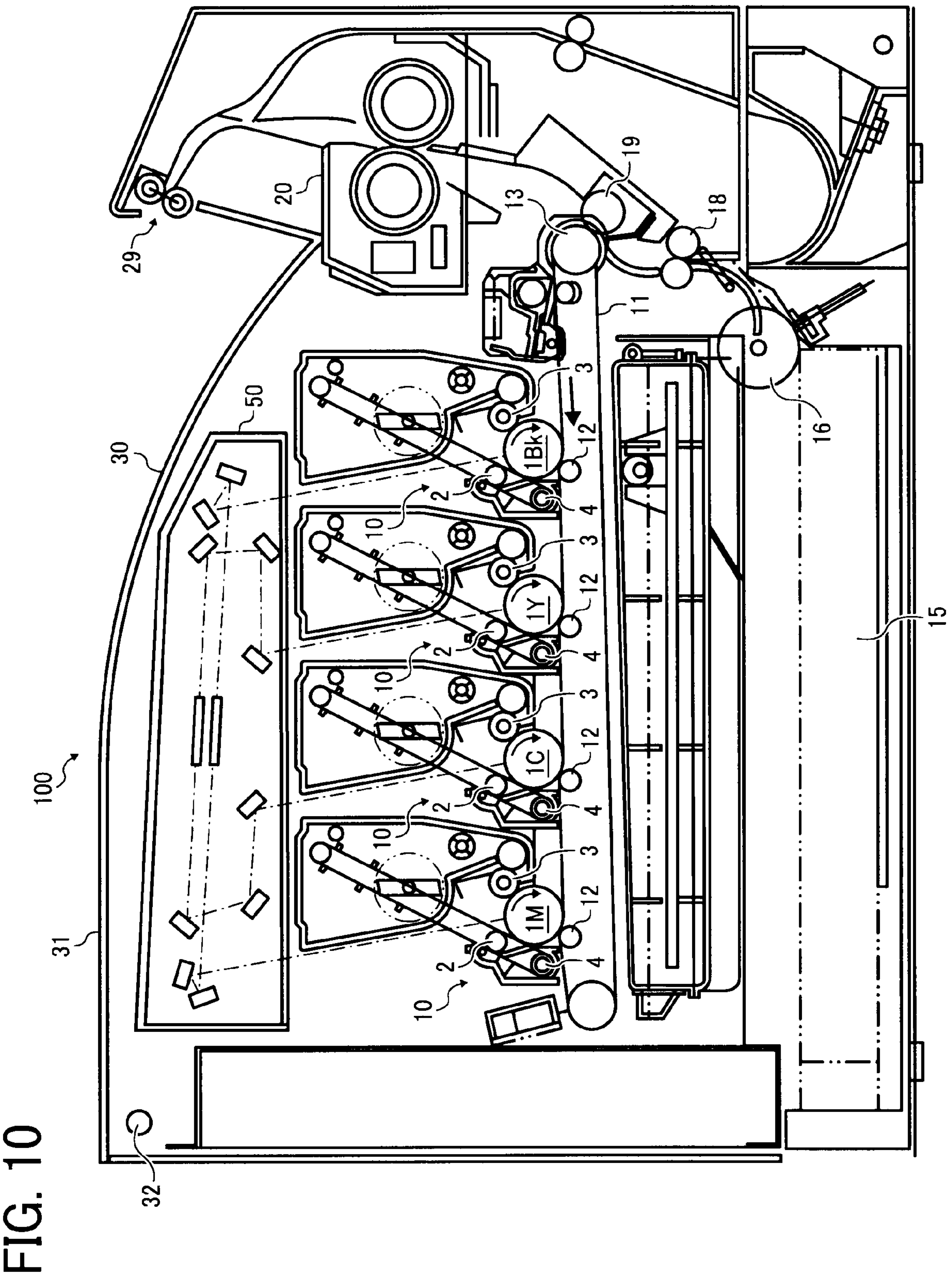
FIG. 10 is a vertical cross-sectional view illustrating a configuration of a full-color printer serving as an example of an image forming apparatus including the optical scanning device.

FIG. 10 is a vertical cross-sectional view illustrating a configuration of a full-color printer serving as the image forming apparatus 100 including the optical scanning device 50. The image forming apparatus 100 includes an intermediate transfer belt 11 at a substantially center portion of the main body thereof. The intermediate transfer belt 11 is stretched across multiple rollers. Four imaging units 10 are arranged along an upper traveling surface of the intermediate transfer belt 11.

The imaging units 10 include photoconductors 1M, 1C, 1Y, and 1Bk (hereinafter collectively referred to as photoconductors 1) each serving as an image bearing member, respectively. A charger 2, a developing device 3, and a cleaning device 4 are provided around each of the photoconductive drums 1. A transfer roller 12 serving as a primary transfer unit is provided at an inner portion of the intermediate transfer belt 11, facing each of the photoconductors 1. According to exemplary embodiments, each of the four imaging units 10 has the same configuration, except that a color of a developer, that is, magenta, cyan, yellow, and black, used in each of the developing devices 3 is different from one another. In the image forming apparatus 100, the imaging units 10 are arranged in order of magenta, cyan, yellow, and black from the left side in FIG. 10. Each of the imaging units 10 is detachably attached to the image forming apparatus 100 as a process cartridge.

The optical scanning device 50 is provided above the imaging units 10. As described above, the optical scanning device 50 includes the polygon scanner 61 and the group of mirrors to direct modulated laser beams onto the surfaces of the photoconductors 1 in the imaging units 10.

A paper feed cassette 15 is provided at the bottom of the image forming apparatus 100. In addition, a paper feed roller 16 configured to feed a recording medium such as a transfer sheet (hereinafter referred to as a sheet) from the paper feed cassette 15 is provided. A pair of registration rollers 18 is provided diagonally above the paper feed roller 16 on a downstream side relative to a paper feed direction. A transfer roller 19 is provided above the pair of registration rollers 18, facing a transfer facing roller 13 serving as one of the rollers across which the intermediate transfer belt 11 is stretched to form a secondary transfer unit.

A fixing device 20 is provided above the secondary transfer unit. A discharge tray 30 is provided on an upper surface of the image forming apparatus 100, and a pair of discharge rollers 29 configured to discharge the sheet to the discharge tray 30 is provided above the fixing device 20.

A description is now given of image formation performed by the image forming apparatus 100 having the above-described configuration.

The photoconductors 1 in the imaging units 10 are rotated in a clockwise direction by a driving unit, not shown, and surfaces of each of the photoconductors 1 are evenly charged to a predetermined polarity by the chargers 2. A laser beam is directed onto each of the surfaces of the photoconductors 1 thus charged from the optical scanning device 50 to form an electrostatic latent image on each of the surfaces of the photoconductors 1. Image data exposed on each of the surfaces of the photoconductors 1 at this time is monochrome image data obtained by separating a full-color image into color data of magenta, cyan, yellow, and black. Toner of each color is applied to each of the electrostatic latent images thus formed from the developing device 3 to form toner images.

The intermediate transfer belt 11 is driven in a counterclockwise direction in FIG. 10, and the toner images of each color are sequentially transferred onto the intermediate transfer belt 11 from each of the photoconductors 1 by the primary transfer rollers 12. Accordingly, the intermediate transfer belt 11 bears a full-color toner image on the surface thereof.

Alternatively, a monochrome toner image may be formed by any one of the imaging units 10, or a toner image using two or three colors may be formed by the appropriate imaging units 10. When the monochrome toner image is formed, the imaging unit 10 using black toner provided on the far right side in the image forming apparatus 100 illustrated in FIG. 10 is used to perform image formation.

Residual toner particles which are not transferred onto the intermediate transfer belt 11 but remain on the surfaces of each of the photoconductors 1 are removed by the cleaning devices 4. Thereafter, a neutralizing device, not shown, neutralizes the potential charge on the surface of each of the photoconductors 1 to prepare for a subsequent image formation.

Meanwhile, the sheet is fed from the paper feed cassette 15 to the secondary transfer unit by the pair of registration rollers 18 in synchronization with entry of the full-color toner image borne on the intermediate transfer belt 11. In the image forming apparatus 100, a transfer voltage having a polarity opposite to the polarity of the toner in the full-color toner image is applied to the transfer roller 19. As a result, the full-color toner image on the intermediate transfer belt 11 is transferred onto the sheet all at once. Heat and pressure are applied to the sheet having the full-color toner image thereon when the sheet passes through the fixing device 20 to fix the full-color toner image to the sheet. The sheet having the fixed toner image thereon is then discharged to the discharge tray 30 provided on the upper surface of the image forming apparatus 100 by the pair of the discharge rollers 29.

An upper cover 31 including the discharge tray 30 on an upper surface thereof is configured to be pivotally openable/closable about a shaft 32. In the image forming apparatus 100, the optical scanning device 50 is provided on the upper cover 31 and is not fixed to the main body of the image forming apparatus 100, such that the optical scanning device 50 is opened/closed together with the upper cover 31 relative to the main body of the image forming apparatus 100. Such a configuration makes it possible to reduce the effect of vibration from the main body of the image forming apparatus 100, thereby achieving high-quality writing and scanning, and preventing image deterioration caused by such vibration. Further, a range of possible layouts of the optical scanning device 50 in the image forming apparatus 100 can be increased, and operation of the optical scanning device 50 is improved.

In the image forming apparatus 100 according to exemplary embodiments, a vibration sensor, not shown, is provided in the optical scanning device 50. Accordingly, vibration and impact applied to the optical scanning device 50 can be detected by the vibration sensor. When a signal output from the vibration sensor exceeds a predetermined value during image formation, the vibration sensor notifies the user of the image forming apparatus 100 that image deterioration may occur due to the vibration.

For example, the vibration sensor may generate an audio alarm to notify the user that image deterioration may occur due to vibration during image formation. Alternatively, a warning light may be turned on or flashed on a control panel or the like of the image forming apparatus 100. In the above-described configurations, it is very important that the alarm or light notifying the user of vibration is distinguishable from other sounds or lights notifying the user of other malfunctions of the image forming apparatus 100. However, the user may not identify a difference in the alarm sounds or light. Further, such a notification may not be conveyed to the user by the audio alarm or the warning light. To solve such problems, a text or a pictorial symbol for notifying the user of vibration may be displayed on the control panel. Alternatively, a warning message indicating that the amount of the vibration or impact exceeds a predetermined value may be sent to a device issuing a print request such as a personal computer to display such a warning message on a screen of the personal computer. For example, a message indicating possible image deterioration due to unexpected vibration or impact from outside of the image forming apparatus may be displayed on the screen of the personal computer. When the user finds irregularities in a printed image because of the message displayed on the screen, printing may be performed again to obtain a proper image.

It is to be noted that the present invention is not limited to the above-described configuration. Thus, for example, the first housing 51 and the second housing 52 may have any appropriate shape. The shape of the second housing 52 is not limited to a rectangle, but may be another polygon. The number of the mounts 68 to fix the first housing 51 to the second housing 52 is not limited to four as described in the foregoing exemplary embodiments, but may be three as illustrated in the fourth exemplary embodiment, or may be five or more.

The first housing 51 may include an optical element such as a lens in addition to the light source 60 and the polygon scanner 61 serving as a deflector. The second housing 52 may include an arbitrary optical element. The optical scanning device 50 may scan the surface of the photoconductor 1 with a single light beam so as to be employed in a monochrome image forming apparatus.

In the image forming apparatus 100 according to the foregoing exemplary embodiments, a configuration of each unit such as the imaging units 10 may be arbitrarily set. For example, a transfer method applied to the image forming apparatus 100 is not limited to an indirect transfer method, but may be a direct transfer method. The arrangement order of the imaging units 10 in the tandem-type image forming apparatus may be arbitrarily set. Not only the tandem-type image forming apparatus but also an image forming apparatus in which multiple developing devices are provided around a single photoconductor or a revolver-type developing device is provided may be used. Further, the present invention may be applied to a full-color image forming apparatus using three toner colors, a multicolor image forming apparatus using two toner colors, and a monochrome image forming apparatus. Needless to say, the image forming apparatus 100 according to the foregoing exemplary embodiments is not limited to a printer, but may be a copier, a facsimile machine, and a multifunction apparatus that combines the functions of the copier, the printer, and the facsimile machine.

Elements and/or features of different exemplary embodiments may be combined with each other and/or substituted for each other within the scope of this disclosure and appended claims.

Example embodiments being thus described, it will be apparent that the same may be varied in many ways. Such exemplary variations are not to be regarded as a departure from the spirit and scope of the present invention, and all such modifications as would be obvious to one skilled in the art are intended to be included within the scope of the following claims.

The number of constituent elements, locations, shapes and so forth of the constituent elements are not limited to any of the structure for performing the methodology illustrated in the drawings.

What is claimed is:

1. An optical scanning device, comprising:

a first housing comprising a rotating deflector configured to deflect a light beam from at least one light source to scan a surface to be scanned with a deflected light beam;

a second housing comprising one or more reflecting mirrors; and three supporting members configured to support the second housing relative to an image forming apparatus, wherein the first housing is mounted inside the second housing, and mounts to fix the first housing to the second housing are positioned substantially on or within sides of a triangle formed by the three supporting members.

2. The optical scanning device according to claim 1, wherein the at least one light source is disposed within the first housing.

3. The optical scanning device according to claim 1, wherein the first housing further comprises an fθ lens.

4. The optical scanning device according to claim 1, wherein the second housing further comprises a synchronization detector configured to control a light beam emission timing with which the light source emits the light beam.

5. The optical scanning device according to claim 1, wherein a number of the mounts is three.

6. The optical scanning device according to claim 1, wherein a number of the mounts is four.

7. The optical scanning device according to claim 6, wherein the four mounts are arranged in a trapezoidal pattern and a base of the trapezoid pattern is positioned along one of the sides of the triangle.

8. The optical scanning device according to claim 1, further comprising an elastic member or a viscoelastic member provided between the second housing and the image forming apparatus including the optical scanning device.

9. The optical scanning device according to claim 1, wherein multiple light sources are configured to emit multiple light beams to scan the surface to be scanned.

10. The optical scanning device according to claim 9, wherein the rotating deflector comprises multiple concentrically stacked rotating polygon mirrors provided on a rotary shaft.

11. An image forming apparatus, comprising:

a latent image bearing member configured to bear an electrostatic latent image;

a charging device configured to charge a surface of the latent image bearing member;

an irradiating device configured to scan and irradiate a charged surface of the latent image bearing member with a light beam according to image data to form an electrostatic latent image thereon;

a developing device configured to develop the electrostatic latent image with toner into a visible toner image;

a transfer device configured to transfer the toner image onto a recording medium; and a fixing device configured to fix the toner image on the recording medium, wherein the irradiating device comprises the optical scanning device according to claim 1.

12. The image forming apparatus according to claim 11, wherein an elastic member or a viscoelastic member is provided between a main body of the image forming apparatus and the second housing of the optical scanning device.

13. The image forming apparatus according to claim 11, wherein an elastic member or a viscoelastic member is provided between the developing device and the second housing of the optical scanning device.

14. The image forming apparatus according to claim 11, further comprising a vibration absorbing member including a viscoelastic member sandwiched between two opposed structural members, provided on an installation surface of the image forming apparatus.

15. The image forming apparatus according to claim 11, further comprising:

a detector configured to detect vibration and impact applied to the optical scanning device; and a notification unit configured to notify a user that an output value from the detector exceeds a predetermined value.

16. The image forming apparatus according to claim 15, wherein the notification unit generates an audio alarm.

17. The image forming apparatus according to claim 15, wherein the notification unit is configured to turn on or flash a warning light.

18. The image forming apparatus according to claim 15, wherein the notification unit displays a warning message.

19. The image forming apparatus according to claim 15, wherein the notification unit reports a malfunction to an external device that has instructed the image forming apparatus to form an image.

20. The image forming apparatus according to claim 11, further comprising an upper cover openably closable relative to a main body of the image forming apparatus, wherein the optical scanning device is disposed within the upper cover.

* * * * *